(12) United States Patent
Day et al.

(10) Patent No.: US 9,467,189 B2
(45) Date of Patent: Oct. 11, 2016

(54) BRIDGE STRENGTHENER FOR A CASE PORT

(71) Applicant: Samsonite IP Holdings S.àr.l., Luxembourg (LU)

(72) Inventors: Bryan Day, San Jose, CA (US); Bryan Hynecek, Redwood City, CA (US); Eric Frasch, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 35 days.

(21) Appl. No.: 14/570,744

(22) Filed: Dec. 15, 2014

(65) Prior Publication Data

US 2016/0173158 A1    Jun. 16, 2016

(51) Int. Cl.
G06F 1/16      (2006.01)
H04B 1/3888    (2015.01)
H04M 1/02      (2006.01)

(52) U.S. Cl.
CPC ......... *H04B 1/3888* (2013.01); *H04M 1/0202* (2013.01)

(58) Field of Classification Search
None
See application file for complete search history.

(56) References Cited

U.S. PATENT DOCUMENTS

| | | | |
|---|---|---|---|
| 2010/0078343 A1* | 4/2010 | Hoellwarth | B29C 45/14639 206/320 |
| 2010/0104814 A1* | 4/2010 | Richardson | H04B 1/3888 428/156 |
| 2010/0203931 A1* | 8/2010 | Hynecek | A45C 11/00 455/575.8 |
| 2011/0228458 A1 | 9/2011 | Richardson et al. | |
| 2011/0228459 A1 | 9/2011 | Richardson et al. | |
| 2014/0092536 A1* | 4/2014 | Dukerschein | H05K 5/02 361/679.01 |
| 2014/0139984 A1* | 5/2014 | Jung | G06F 1/1637 361/679.01 |
| 2014/0240911 A1* | 8/2014 | Cole | G06F 1/1626 361/679.3 |
| 2015/0061475 A1* | 3/2015 | Fairchild | H05K 5/0013 312/223.1 |

OTHER PUBLICATIONS

International Search Report and Written Report for application No. PCT/IB2015/002475 dated May 3, 2016.

* cited by examiner

*Primary Examiner* — Anthony Q Edwards
(74) *Attorney, Agent, or Firm* — Frommer Lawrence & Haug LLP

(57) ABSTRACT

A bridge support structure for a case or cover.

10 Claims, 3 Drawing Sheets

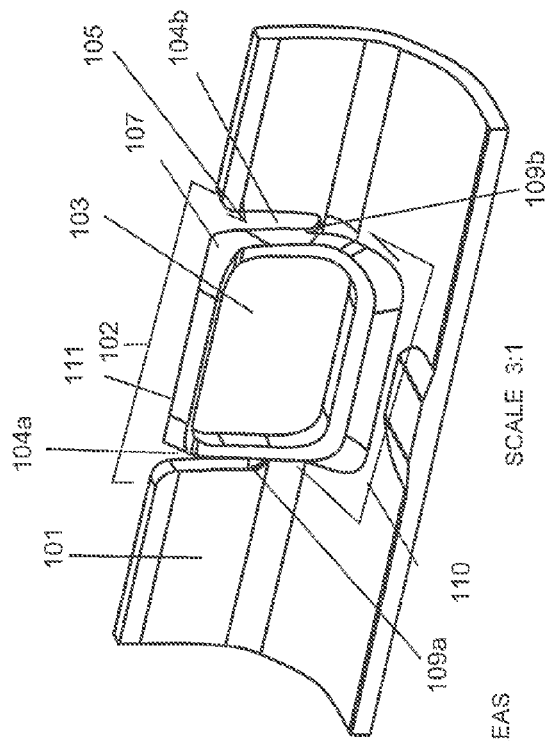
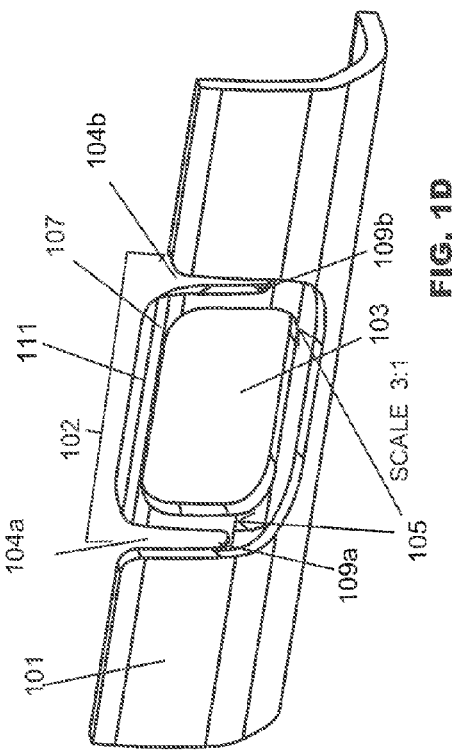
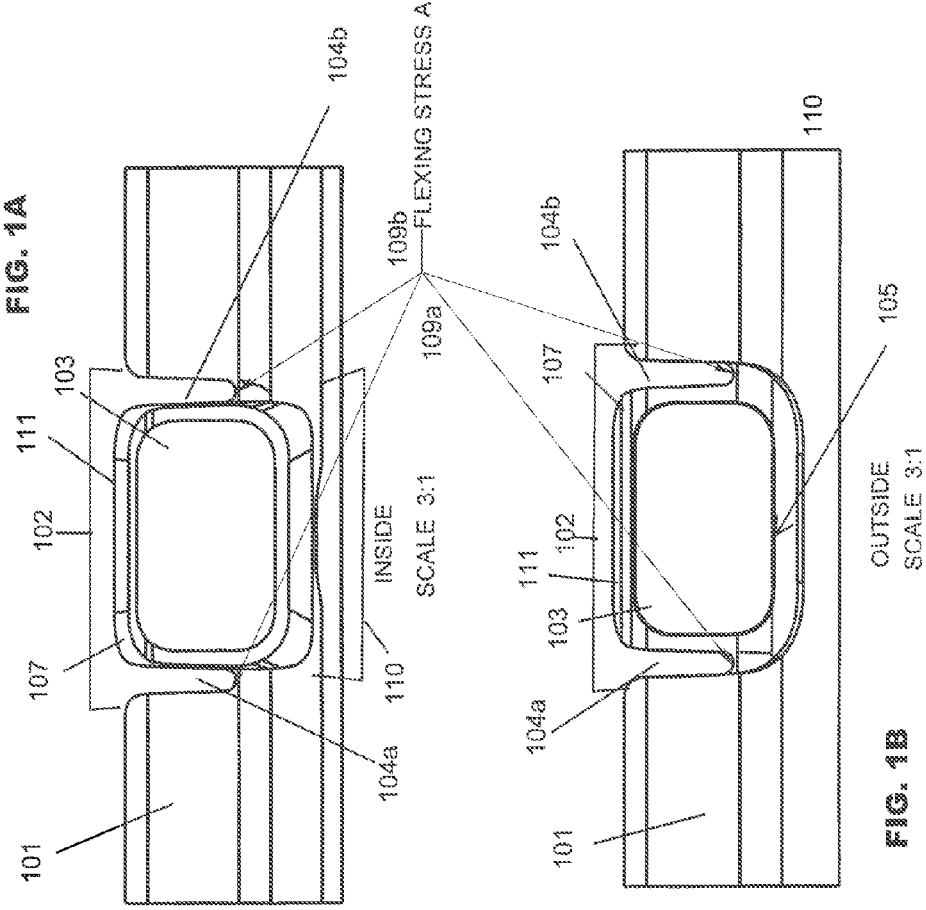

BRIDGE STRENGTHENER FOR A CASE PORT

DESCRIPTION OF RELATED TECHNOLOGY

A case or cover for an electronic device such as a smart phone, cell phone, GPS unit, MP3 player, tablet, camera, or laptop computer.

Normally, the port areas for such cases are strengthened by molding a small section of plastic on the screen side of the case. Initially, this feature would stiffen the case, but the bridge quickly elongates and eventually breaks because each time the case is taken on or off, the small plastic section would need to stretch axially beyond it's elastic limit.

SUMMARY

According to an embodiment, disclosed is a case or cover for an electronic device comprising: a rigid substrate including a bridge support structure, the bridge support structure including a flange including an opening, the flange being connected or formed with the substrate to be flexible such that the stress on the bridge support structure is reduced.

In an embodiment the flange is connected or formed with the substrate to form a space for a molded inset on the outer side of the substrate, the molded inset including a complementary opening with the flange opening.

In an embodiment the molded inset forms a contiguous outside surface with the outer shell.

In an embodiment and elastomeric molded portion for the case includes the molded inset.

In an embodiment the bridge support structure comprises the flange together with the substrate forming a first groove and a second groove, wherein each groove includes a shaped bottom where the plate is connected with the substrate.

In an embodiment the bridge support structure is formed together with substrate.

In an embodiment the bridge support structure is formed separately from the substrate and attached thereto.

In an embodiment the molded portion and molded inset is formed together with an elastomeric interior layer of the case or cover.

BRIEF DESCRIPTION OF THE DRAWINGS

Embodiments of the invention are illustrated in the figures of the accompanying drawings, which are meant to be exemplary and not limiting, and in which like references are intended to refer to like or corresponding things.

FIGS. 1A-1D show an exemplary embodiment of a substrate for a case including an exemplary bridge support structure for a protective case or cover.

DETAILED DESCRIPTION OF THE EMBODIMENTS

Figure 2A:
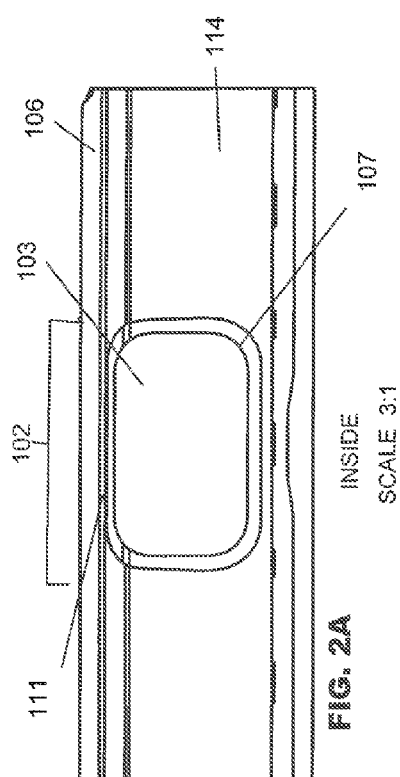
FIGS. 2A-2D show an exemplary embodiment of a substrate and molded portion forming an exemplary bridge support structure for a case or cover.

Disclosed are embodiments of a protective case 100, faceplate, or other protective covering for an electronic device (not shown). As used herein a protective "case" or "cover" broadly encompass all forms of protective coverings and parts thereof for personal electronic devices as known in the art, including cases, skins, faceplates, shields or covers applied to the device for protection or style. Embodiments described herein are not limiting but are offered to give a clear understanding of the invention, which can be employed in all such protective cases or covers. Exemplary personal electronic devices include those referred to herein, including mobile telephones, so called "smart phones" (e.g., iPhone™ Android™ or Blackberry™), laptop computers, tablet computers, digital audio players, GPS units, MP3 players, tablets, cameras, and the like.

FIGS. 1A-1D show an exemplary embodiment of a substrate for a protective case. In an embodiment, the case 100 includes openings 103 configured to provide ports for access to the input components of the device through an exterior of the case.

The case 100 comprises a substrate 101 that can form the exterior portion or shell, and is configured to attach and protectively cover the electronic device. This protective exterior shell 101 allows the device protection from impacts. In an embodiment, the substrate 101 forming the exterior can be designed to mimic the finish of existing electronic devices, for example for users who prefer the feel and look of the original device and would like to maintain that feel but still want protection for their device. In an embodiment, the substrate 101 can be configured to have a low coefficient of friction. This allows the device to easily be slipped in and out of pockets without becoming attached or without great resistance to clothing materials. The substrate 101 may be fabricated from, for example and without limitation, metal, a rigid or semi-rigid plastic material, a rigid rubber material, engineered thermoplastics, a polycarbonate material, a para-aramid material and/or some combination thereof and may be any color or texture.

As seen in FIGS. 1A-1D the exterior layer substrate 101 comprises openings or cutouts 103 configured to provide port openings for access to the input components of the device through an exterior of the case. As used herein, port openings refers broadly to any openings for access to the input/output components, for example, speakers, buttons, jacks, connector ports, microphone ports or holes, sending/receiving ports, and so on.

In an embodiment, as shown in FIGS. 2A-2D and FIG. 3, the case 100 comprises the exterior substrate 101 at least one interior layer 114. An example of a case with more than one layer including an exterior layer and interior layer is disclosed in U.S. patent application Ser. No. 12/366,769, filed on Feb. 6, 2009 and issued as U.S. Pat. No. 8,755,852, entitled "One Piece Co-formed Exterior Hard Shell Case with an Elastomeric Liner for Mobile Electronic Devices," the entirety of which is incorporated by reference hereby. The protective case 100 can include an outer layer formed from the substrate 101 of the protective case 100, comprising two (or more) separate layers, a first external hard shell layer 101 and a second interior elastomeric layer 114. The first external hard shell layer 101 and a second interior elastomeric layer 114 can be combined to independently attach to the electronic device 120, and further includes molded elastomeric port openings 103 that form accessible though holes together with in the hard shell 110. The external hard shell layer substrate 101 and the interior elastomeric layer 114 may be attached in any of several ways, such as glue, chemical bonding, heating, heat treated chemicals or any other means known in the art which permanently attach the external hard substrate 101 to the interior elastomeric layer 114. The interior elastomeric portion 114 provides shock protection for the device from dropping, falls, or other impacts. The interior elastomeric portion 114 can also ensure the device 114 and the protective case 114 fit together with no gaps where the protective case 100 is a single piece assembly. The case further includes a molded portion molded over the top of the sides of the case. In an exemplary embodiment, the molded portion is shown as an overmold 106 molded over the top of the sides of the case, but as will be understood, any molding technique or multi-material, multi-component forming technique can be employed as known in the art, including but not limited to overmolding, co-molding, and multi-material molding. In an exemplary embodiment the overmold 106 can be formed together with and made from the same material as the interior elastomeric portion 114.

Figure 2B:
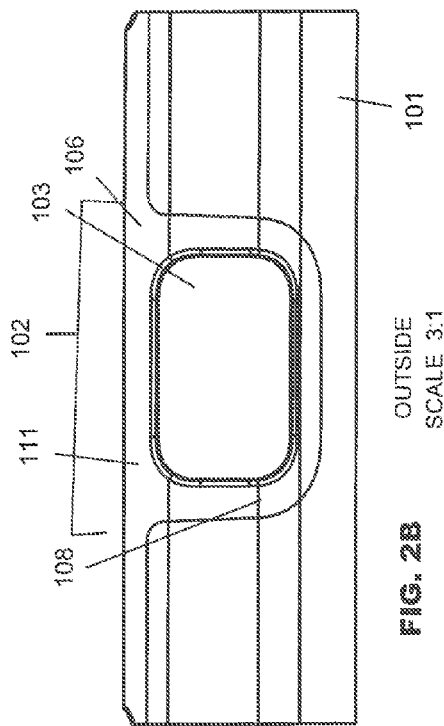
Figure 2C:
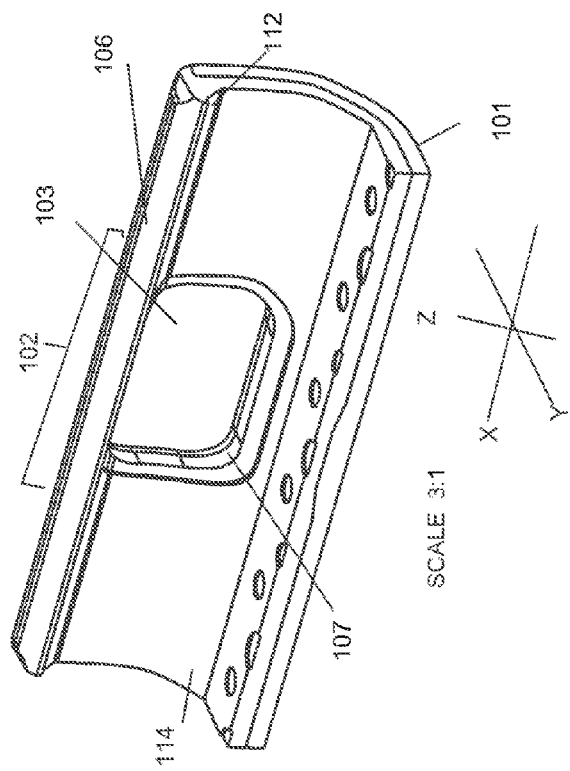
Figure 2D:
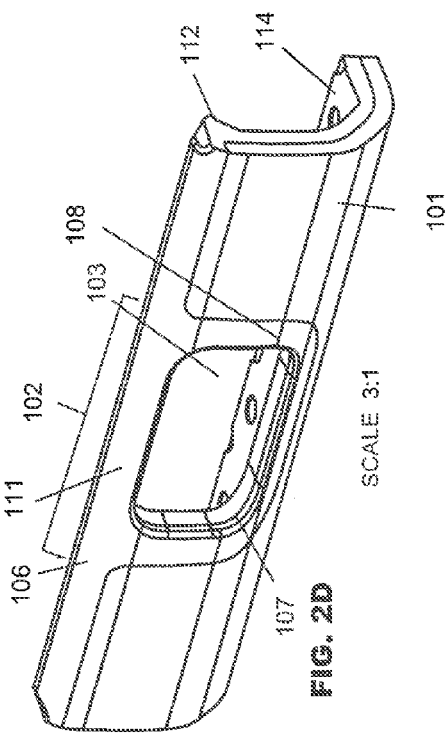
Figure 3:
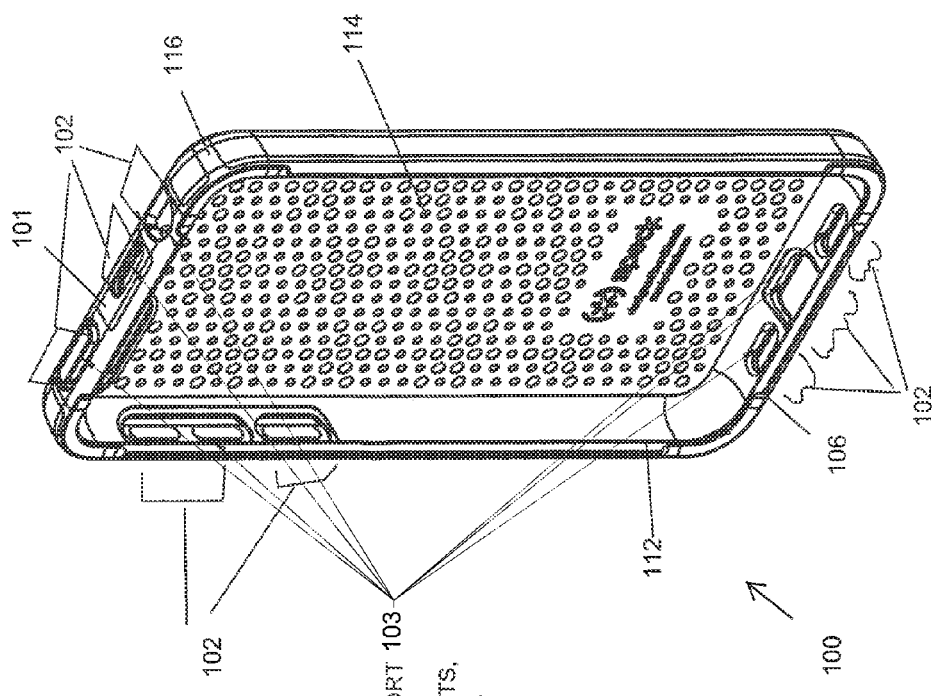
FIG. 3 shows an exemplary embodiment of a case or cover comprising a plurality of ports including bridge support structures.

FIGS. 2A-2D and FIG. 3 are views of an embodiment of the protective case 100 showing the bridge support structure 102 created by the overmold 106 together with an inner elastomeric layer 114. The protective case 100 is fitted to clasp onto a device (not shown), and can incorporate a detent 112 or overhang to ensure a snug and secure fit. In the exemplary embodiment, rather than having an undercut in the external hard shell layer 101 and its corresponding sides of the protective case 100, the inner elastomeric layer 114 forms features that would secure the protective case to a device (not shown). These features could be detents 112 along a perimeter of the external hard shell layer 101 such as illustrated in FIGS. 2-3 where an additional elastomeric detent 112 for securing a device may be included in the protective case 100 so that a device would be slipped under and secured thereby with some form of undercut on the opposite end whether molded into the external hard shell layer 101 or the inner elastomeric layer 114.

In another embodiment, the external hard shell layer 101 can define a fitted cavity fitted to clasp onto a device (not shown) and incorporate a detent to ensure a snug and secure fit.

The handheld device protective case depicts the external hard shell layer 101 with cut corners 116 and inner elastomeric layer 114 of the protective carrying case where the inner elastomeric layer 114 fills in the cut corners 116 of the external hard shell layer 101. In the embodiment, to allow the external hard shell layer 101 to be able to be mounted on a device, the corners 116 of the external hard shell layer 101 are cut open. This allows each sidewall of the external hard shell layer 101 to flex away when a device is inserted and snap back once it is in place. An inner elastomeric layer 114 is formed in addition to the external hard shell layer 101 on the interior of the external hard shell layer 101. The inner elastomeric layer 114 fills in the gaps created at the corners 111 of the external hard shell layer 101 to allow the external hard shell layer 102 to flex during mounting.

The inner elastomeric layer 114 provided in this location has greater inherent flexibility than the plastic or metal of the external hard shell layer 101 and it stretches sufficiently to allow the sidewalls of the external hard shell layer 101 to still flex away on mounting. This creates a one-piece protective case 100 that wraps around a device even on corners and prevents dirt and fluids from entering wherever possible. The inner elastomeric layer 114 also can be formed over the buttons on a device wherein a user simply presses the exposed inner elastomeric layer 114 at a port opening corresponding to the portion of the mobile electronic device input.

In an embodiment, the case 100 comprises a bridge support structure 102 that surrounds the port openings 103 of an electronic device case 100. The bridge support structure 102 is configured to allow the case 100 to flex when taking the case on or off without breaking the rigid material of the case 100. The port support 110 can also help reduce the likelihood of the overmold 106 delaminating from the hard plastic substrate 101, while keeping the case relatively stiff.

In an embodiment, the 100 for an electronic device comprises a rigid substrate 101 including the bridge support structure 102. In an embodiment, the bridge support structure 102 is comprises a substantially rectangular flange 107 and includes an opening 103. Although the flange is shown as substantially rectangular, it can be any shape including the port opening 103, including annular, square, elliptical, a polygon, pi-shaped, T-shaped, and so on consistent with the description herein.

In an embodiment, flange 107 of the bridge support structure 102 together with the substrate 102 forms a first groove 104a and a second groove 104b, wherein each groove 104a, 104b includes a shaped bottom 109a, 109b where the bridge support structure 102 is connected with the substrate 101 at the port area 110. Although the grooves are shown as comprising a rounded bottom, the grooves can have any shape as the flange is adapted to flex as a function of the grooves defining the flange. For example, the grooves 109a, 109b could have a flat or substantially flat bottom or other shaped bottom. The first and second grooves 104a, 104b on either side of the flange 107 allow a bridge portion 111 of the flange 107 and the bridge support structure 102 to move and flex so as to reduce stress on the bridge support structure. For example as shown in the embodiments described herein, the flange 107 is flexible in a Y direction with respect to a sidewall of the case 100 being in the X direction and the depth of the case 100 being in the Z direction. The shaped bottoms 109a, 109b act as flexing stress areas. As such, the bridge support structure 102 is configured to include flex zones such that the bridge portion 111 of the bridge support structure 102 can flex away when a device is inserted and snap back once it is in place, and can further flex and snap back along, among other vectors, the Y direction when accepting other stress forces, for example when a user presses a button or inputs headphones at a port. As shown in FIGS. 2A-2D, the bridge support structure 102 has sufficient material from the flange 107 and the overmold 106 and molded inset 108 to prevent breakage despite the presence of an opening 103. In an embodiment, the flange 102 is formed together with substrate. In another embodiment, the flange 107 is formed separately from the substrate 101 and attached thereto.

In the embodiment, the elastomeric material of the molded inset 108 makes for a shorter distance across the groove, thereby reducing the area over which force is applied, thus avoiding overstretching of the elastomeric or other softer, lower modulus material.

The bridge support structure 102 is connected or formed with the substrate 101 at a port area to be flexible. As shown in FIGS. 1B, 1D and FIGS. 2B and 2D the flange 107 is connected or formed with the substrate 101 to form a space 105 for an molded inset 108 on the outer side of the substrate, the molded inset 108 including a complementary opening with the flange 107 opening to form a port opening 103. As shown in FIGS. 2B and 2D, in an embodiment the molded inset 108 forms a contiguous outside surface with the outer shell substrate 102 of the case 100. In an embodiment, the overmold 106 for the case 100 includes the molded inset 108. In an exemplary embodiment the overmold 106 can be formed together with and made from the same material as the interior elastomeric portion 114. In another embodiment the overmold 106 including the molded inset 108 may be made of a different material, for example, and elastomeric or pliant material that also allows flexing. Though shown as an overmold 106, this molded portion and the molded inset 108 can be molded using any techniques known in the art, including molding, co-molding, multi-material molding, overmolding, and can include gluing, chemical bonding, heating, heat treated chemicals or any other means known in the art which permanently attach the substrate 101 to the molded material.

As demonstrated in the exemplary embodiment of FIG. 3 the bridge support structure 102 can be implemented on any kind of port for a case 100, for example, speakers, buttons, connector ports, microphone ports or holes, and sending/receiving ports.

The case 100 may have one or more layers. For example, although exemplary embodiments of the case are described as including an overmold 106 and molded inset 108 that has the same or similar material as an inner layer 114 of the case 100, the case 100 could be constructed with only a single layer that employs, for example, an overmold 106 and molded inset 108 for the bridge support structure 102, but otherwise has no interior layer.

The material used for case 100 can be selected from the following list (or their combinations): plastic, elastic material, rubber, any artificial material, rigid, soft, flexible, wood, glass, mirror, smooth, rough, coarse material or surface, metal, alloy, nylon, cotton, wool, fabric, natural material, convex, concave, flat surface, quartz, transparent, translucent, opaque material, uniform, or non-uniform surface.

It is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their equivalents, rather than by the examples and embodiments given.

The invention claimed is:

1. A case or cover for an electronic device comprising:
    a rigid substrate including a bridge support structure
    the bridge support structure including a flange including an opening, the flange being connected or formed with the substrate to be flexible such that the stress on the bridge support structure is reduced.

2. The case or cover of claim 1 wherein the flange is connected or formed with the substrate to form a space for a molded inset on the outer side of the substrate, the molded inset including a complementary opening with the flange opening.

3. The case or cover of claim 2 wherein the molded inset forms a contiguous outside surface with the outer shell.

4. The case or cover of claim 2, wherein an overmold or molded portion for the case includes the molded inset.

5. The case or cover of claim 1 wherein the bridge support structure comprises:
    the flange together with the substrate forming a first groove and a second groove, wherein each groove includes a shaped bottom where the plate is connected with the substrate.

6. The case or cover of claim 5 where the bridge support structure is formed together with substrate.

7. The case or cover of claim 6 where the bridge support structure is formed separately from the substrate and attached thereto.

8. The case or cover of claim 4 wherein the overmold and molded inset is formed together with an elastomeric interior layer of the case or cover.

9. The case or cover of claim 3 wherein an overmold or molded portion for the case includes the molded inset.

10. The case or cover of claim 9 wherein the overmold and molded inset is formed together with an elastomeric interior layer of the case or cover.

* * * * *